United States Patent [19]
Baanders et al.

[11] Patent Number: 5,863,971
[45] Date of Patent: Jan. 26, 1999

[54] PROCESS FOR PREPARING BITUMEN COMPOSITIONS

[75] Inventors: Rudolf Baanders; Gerrit Van Gooswilligen; Koen Steernberg, all of Amsterdam, Netherlands

[73] Assignee: Shell Oil Company, Houston, Tex.

[21] Appl. No.: 857,943

[22] Filed: May 16, 1997

[30] Foreign Application Priority Data

May 20, 1996 [EP] European Pat. Off. .............. 96303570

[51] Int. Cl.$^6$ .................................................... C08L 95/00
[52] U.S. Cl. .................................................................. 524/68
[58] Field of Search ................................. 524/59, 68, 69, 524/70, 71

[56] References Cited

U.S. PATENT DOCUMENTS

| | | | |
|---|---|---|---|
| 4,454,269 | 6/1984 | Goodrich | 524/69 |
| 4,464,427 | 8/1984 | Barlow | 524/68 |
| 4,745,155 | 5/1988 | Grossi | 524/68 |
| 5,151,456 | 9/1992 | Elias et al. | 524/60 |
| 5,182,319 | 1/1993 | Mitchell | 524/68 |
| 5,601,642 | 2/1997 | Drieskens et al. | 524/68 |

FOREIGN PATENT DOCUMENTS

| | | |
|---|---|---|
| 458386 A1 | 5/1990 | European Pat. Off. . |
| 86/06736 | 5/1986 | WIPO . |

*Primary Examiner*—Peter A. Szekely
*Attorney, Agent, or Firm*—Donald F. Haas

[57] ABSTRACT

The present invention provides a process for preparing a bitumen composition which comprises mixing at an elevated temperature an oxidised bitumen having a penetration index of at least 0 with a thermoplastic rubber which is present in an amount of less than 5% wt., based on total bitumen composition; bitumen compositions obtainable by such process; and the use of such bitumen compositions in asphalt mixtures for road applications.

13 Claims, No Drawings

PROCESS FOR PREPARING BITUMEN COMPOSITIONS

FIELD OF THE INVENTION

The present invention relates to a process for preparing bitumen compositions, bitumen compositions obtainable by such process and the use of the composition in asphalt mixtures for road applications.

BACKGROUND OF THE INVENTION

Bitumen is used as a binder in road asphalt mixtures, and has developed continually to meet ever-increasing performance demands from road building constructors. In general bitumen performs well in road asphalt, but increasingly heavy traffic loads have led to the premature wear of many roads through rutting and cracking of the surface. Cracking is a serious defect in a road asphalt because it allows water to reach lower layers of the road surface where it causes rapid deterioration, and accelerates the need for premature repairs. Increasing the bitumen content of asphalt or using a softer grade of bitumen improves the crack resistance of asphalt at low temperatures but increases the risk of excessive rutting at higher temperatures because the mixture is effectively softer. Conversely, resistance of rutting can be improved by reducing the amount of bitumen in the asphalt mixture or by using a harder grade of bitumen, at the expense of crack resistance because the mixture becomes less flexible.

In view of the above it will be clear that it would be advantageous to develop a hard bitumen composition meeting today's crack resistance requirement, i.e. a bitumen composition having both a good low temperature performance and a good high temperature rutting resistance.

It is known that the low temperature properties of bitumen can be improved by blending them with a polymer. However, when this modification is applied to hard bitumen, an incompatibility between the bitumen and the polymer is generally observed, resulting in hardly or not improved low temperature properties and a relatively poor ageing behaviour.

It is further known to prepare industrial and roofing-grade bitumen by subjecting a bitumen/polymer mixture to a conventional blowing process. These bitumen compositions, however, appear to be not suitable for road applications, due to their high softening point and relatively high penetration.

SUMMARY OF THE INVENTION

One object of the present invention is to provide a bitumen composition suitable for road applications having both a good low temperature performance and a good high temperature rutting resistance, and in addition an improved ageing behaviour. Surprisingly, it has now been found that such bitumen composition can be prepared by mixing a particular bitumen with a thermoplastic rubber.

Accordingly, the present invention relates to a process for preparing a bitumen composition which comprises mixing at an elevated temperature an oxidised bitumen having a penetration index of at least 0 with a thermoplastic rubber which is present in an amount of less than 5% wt., based on total bitumen composition.

DETAILED DESCRIPTION OF THE INVENTION

In the process of the present invention, a bitumen composition is prepared by mixing at an elevated temperature an oxidised bitumen having a penetration index of at least 0 with a thermoplastic rubber which is present in an amount of less than 5% wt. based on the total butimen composition.

Preferably, the bitumen has a penetration index of at most 5. More preferably, the bitumen has a penetration index in the range of from 0 to 2.

Suitably, the thermoplastic rubber is present in an amount of less than 3% wt., preferably in the range of from 0.1 to 2.5% wt., based on total bitumen composition.

Suitably, the present process is carried out at a temperature in the range of from about 160° C. to about 220° C.

Preferably, the process according to the present invention is carried out at a temperature in the range of from about 170° C. to about 190° C.

The process may be carried out at ambient pressure or elevated pressure. Normally, however, it will be carried out at ambient pressure.

Suitably, the present process is carried out over a period of time of less than 6 hours, preferably less than 2 hours.

The oxidised bitumen is suitably obtained by subjecting a bitumen to a blowing process. More preferably, the oxidised bitumen is obtained by subjecting a bitumen to a catalytic blowing process. Suitable catalysts to be used in such blowing process include those taught in the art such as ferric chloride, phosphorus pentoxide, aluminium chloride, boric acid and phosphoric acid, the latter being preferred. The catalyst is normally added to the bitumen to be blown in an amount of less than 2.5% wt., based on bitumen. The blowing process is carried out with an oxygen-containing gas, such as air or pure oxygen. Preferably, use is made of air. The blowing process may be carried out at ambient pressure or elevated pressure. Normally, however, it will be carried out at ambient pressure.

Suitably, the catalytic blowing process is carried out over a period of time of less than 8 hours, preferably less than 4 hours.

Suitably, such blowing process is carried out at a temperature in the range of from about 200° C. to about 350° C., preferably in the range of from about 250° C. to about 300° C.

The bitumen to be oxidised may be a residue from distillation of crude oil, a cracked residue, an extract of a crude oil, a bitumen derived from propane bitumen, butane bitumen, pentane bitumen or mixtures thereof. Other suitable bitumen's include mixtures of the above bitumen with extenders (fluxes) such as petroleum extracts, e.g. aromatic extracts, distillates or residues. Suitably, the bitumen to be oxidised has a penetration in the range of from 50 to 400 dmm, preferably 100 to 300 dmm, and more preferably 200 to 300 dmm (as measured by ASTM D 5° at 25° C.), and a softening point in the range of from about 30° C. to about 65° C., preferably in the range of from about 35° C. to about 60° C. (as measured by ASTM D 36).

The penetration index (PI) of the oxidised bitumen is determined by means of its penetration and softening point as is well appreciated by the skilled person (see for instance, The Shell Bitumen Handbook 1991, pages 74 and 75).

All bitumens display thermoplastic properties, i.e., they become softer when heated and harder when cooled. Several expressions exist to define the way the viscosity (or consistency) changes with the temperature. One of the best known is that developed by Pfeiffer and Van Doormaal. If the logarithm of penetration, P, is plotted against temperature, T, a straight line is obtained such that:

$$\log P = AT + K$$

where A is the temperature susceptibility of the logarithm of the penetration

K is a constant.

The value of A varies from about 0.015 to 0.06 showing that there may a considerable difference in temperature susceptibility. Pfeiffer and Van Doormaal developed an expression for the temperature susceptibility which would assume a value of about zero for road bitumens. For this reason they defined penetration index (PI) as:

$$\frac{20 - PI}{10 + PI} = 50A$$

or explicitly $$PI = \frac{20(1 - 25A)}{1 + 50A}$$

The value of PI ranges from about −3 for highly temperature susceptible bitumens to about +7 for highly blown low temperature susceptible (high PI) bitumens. The PI is an unequivocal function of A and hence it may be used for the same purpose. The values of A and PI can be derived from penetration measurements at two temperatures, $T_1$ and $T_2$, using equation:

$$A = \frac{\log \text{pen at } T_1 - \log \text{pen at } T_2}{T_1 - T_2}$$

The consistency at the softening point can be expressed in terms of penetration, both by linear extrapolation of logarithm of pen vs temperature and by direct measurement with an extra long penetration needle at the ASTM softening point temperature. Pfeiffer and Van Doormaal found that at the ASTM softening point temperature most bitumens had a penetration of about 800. Replacing $T_2$ in the above equation by the ASTM softening point temperature and the penetration at $T_2$ by 800 they obtained the equation:

$$A = \frac{\log \text{pen at } T_1 - \log 800}{T_1 \text{ ASTM softening point}}$$

Substituting this equation in the above PI equation and assuming a penetration test temperature of 25° C., we have:

$$PI = \frac{1952 - 500 \log \text{pen} - 20 \, SP}{50 \log \text{pen} - SP - 120}$$

The assumption of a penetration of 800 at the softening point temperature is not valid for all bitumens. It is thus advisable to calculate the temperature susceptibility using penetration at two temperatures, $T_1$ and $T_2$.

The oxidised bitumen is mixed with a thermoplastic rubber. Suitably, the oxidised bitumen can be mixed with one or more different types of thermoplastic rubbers.

Although a wide range of thermoplastic rubbers can suitably be used in accordance with the present invention, the preferred thermoplastic rubbers comprise optionally hydrogenated block copolymers which comprise at least two terminal poly(monovinylaromatic hydrocarbon) blocks and at least one central poly(conjugated diene) block, forming a continuous network.

Preferably block copolymer constituents are selected from the group consisting of those of the formula $A(BA)_m$ or $(AB)_nX$, wherein A represents a block copolymer of predominantly poly(monovinylaromatic hydrocarbon), wherein B represents a block of predominantly poly(conjugated diene), wherein X represents the residue of a multivalent coupling agent and wherein n represents an integer $\geq 1$, preferably $\geq 2$, and m represents an integer $\geq 1$, preferably m is 1.

More preferably, the blocks A represent predominantly poly(styrene) blocks and the B blocks represent predominantly poly(butadiene) blocks or predominantly poly(isoprene) blocks. Multivalent coupling agents to be used include those commonly know in the art.

With the term "predominantly" is meant that the respective blocks A and B are mainly derived from monovinyl aromatic hydrocarbon monomers and conjugated diene monomers, which monomers may be mixed with other structurally related or non-related co-monomers, e.g. monovinyl aromatic hydrocarbon monomers as main component and small amounts (up to 10%) of other monomers or butadiene mixed with isoprene or small amounts of styrene.

More preferably, the block copolymers contain pure poly(styrene), pure poly(isoprene) or pure poly(butadiene) blocks, of which the poly(isoprene) or poly(butadiene) blocks, may be selectively hydrogenated to at most a residual ethylenic unsaturation of 20%, more preferably less than 5% of its original unsaturation content prior to hydrogenation. Preferably, however, the block copolymers are not selectively hydrogenated. Most preferably, the applied block copolymer has the structure ABA, wherein A has an apparent molecular weight of from 3000 to 100,000, preferably from 5000 to 25,000 and the diblocks AB have an apparent molecular weight in the range of from 50,000 to 170,000. Preferably, the diblocks AB have an apparent molecular weight in the range of from 70,000 to 120,000.

With the term "apparent molecular weight" as used throughout the specification is meant the molecular weight of a polymer, as measured with gel permeation chromatography (GPC) using poly(styrene) calibration standards such as by the ASTM D 3536-91 standard test method.

The originally prepared poly(conjugated diene) blocks usually contain from 5 to 65% by weight vinyl groups, originating from 1,2 polymerisation relative to the conjugated diene molecules, and preferably a vinyl content from 10 to 55% by weight.

The complete block copolymer to be used according to the present invention, is normally containing polymerised vinyl aromatic hydrocarbon monomers in an amount of from 10 to 60% by weight and preferably from 15 to 45% by weight.

The apparent molecular weight of the total block copolymer will normally be in the range of from 100,000 to 500,000 and preferably in the range of from 250,000 to 450,000 and most preferably in the range of from 350,000 to 400,000.

As examples of suitable pure block copolymers can be mentioned KRATON® G-1651, KRATON® G-1654, KRATON® G-1657, KRATON® G-1650, KRATON® G-1701, KRATON® D-1101, KRATON® D-1102, KRATON® D-1107, KRATON® D-1111, KRATON® 8 D-1116, KRATON® D-1117, KRATON® D-1118, KRATON® D-1122, KRATON® D-1135X, KRATON® D-1184, KRATON® D-1144X, KRATON® 0 D-1300X, KRATON® D-4141 and KRATON® D-4158 block copolymers.

The present invention further provides a bitumen composition obtainable by any of the processes described hereinbefore. Such bitumen composition is very attractive since it displays both a good low temperature performance and a good high temperature rutting resistance.

Suitably, the bitumen composition has a penetration in the range of from 30 to 300 dmm, preferably of from 100 to 200 dmm (as measured by ASTM D 5 at 25° C.), and a softening point in the range of from about 50° C. to about 120° C., preferably of from about 60° C. to about 100° C. (as measured by ASTM D 36).

Suitably, such bitumen composition has a G*/sin δ– value of at least 1 kPa (at 64° C.), preferably in the range of from 1 to 2 kPa (at 64° C.), and a m-value of at least 0.30 (at –6° C.), preferably at least 0.33 (at –6° C.), (both the G*/sin δ– value and the m-value have been defined in Superpave Series No. 1 (SP-1), Asphalt Institute, which document is hereby incorporated by reference).

Fillers such as carbon black, silica and calcium carbonate, stabilisers, antioxidants, pigments, and solvents are known to be useful in bitumen compositions and can be incorporated in the bitumen compositions of this invention in concentrations taught in the art.

The present invention still further provides the use of a bitumen composition as described hereinbefore in an asphalt mixture for road applications.

The present invention will now be illustrated by means of the following Examples which are included for illustrative purposes only and are no way meant to limit the present invention.

EXAMPLE 1

An oxidised bitumen having a PI of 0.8 was obtained by subjecting a bitumen having a PI of –0.7 to a catalytic blowing process using phosphoric acid as catalyst, whereafter the blown bitumen obtained was mixed with a naphthenic flux. Said oxidised bitumen was then mixed with at a temperature of 180° C. and for 1 hour with 2% by weight of a non-hydrogenated radial polystyrene-polybutadiene-polystyrene block copolymer, based on total bitumen composition. The block copolymer had a 30% w styrene content, an apparent molecular weight of 380,000 and contained polystyrene-polybutadiene diblocks having an apparent molecular weight of 112,000. The main properties of the bitumen composition so obtained are given in the upper part of Table 1.

The bitumen composition obtained was then subjected to the Rolling Thin Film Oven Test (ASTM test method D 2572) whereafter it was further aged in a Pressure Ageing Vessel (AASHTO PP1). The main properties of the bitumen composition after these ageing tests are shown in the bottom part of Table 1.

EXAMPLE 2

A process was carried out in a similar way as described in Example 1 except that a bitumen having a PI of –0.9 and which had not been subjected to an oxidation treatment was mixed with 4% by weight of the radial polystyrene-polybutadiene-polystyreneblock copolymer, based on total bitumen composition. The main properties of the non-oxidised bitumen composition so obtained are given in the upper part of Table 1

The bitumen composition was then subjected to the Rolling Thin Film Oven Test (ASTM test method D 2572) whereafter it was further aged in a Pressure Ageing Vessel (AASHTO PP1). The main properties of the bitumen composition after these ageing tests are shown in the bottom part of Table 1.

TABLE 1

| Bitumen composition | Example 1 | Example 2 |
| --- | --- | --- |
| Before RTFOT/PAV | | |
| Penetration at 25° C., dmm | 151 | 113 |
| Softening point (R&B), °C. | 49.5 | 62.9 |
| Viscosity at 135° C., Pa.s | 0.764 | 0.818 |
| G*/sin δ at 64° C., kpa | 1.13 | 1.23 |
| After RTFOT | | |
| G*/sin δ at 64° C., kPa | 3.87 | 2.47 |
| After RTFOT/PAV | | |
| G* sin δ at 19° C., kpa | 2082 | 4094 |
| Stiffness at –24° C., Mpa | 124 | 278 |
| m-value at –24° C. | 0.333 | 0.317 |

From Table 1 it will be clear that the bitumen composition prepared in accordance with the present invention (Example 1) displays i) an improved high temperature rutting resistance (after RTFOT) and ii) an improved low temperature performance (after RTFOT/PAV) when compared with a bitumen composition containing a bitumen which has not been subjected to an oxidation treatment (Example 2). A finding which is especially surprising if one takes into account the fact that in Example 1 much less block copolymer is applied.

We claim:

1. A process for preparing a bitumen composition for use in road applications which comprises mixing at a temperature of 160° C. to 220° C. an oxidised bitumen having a penetration index of at least 0 with a thermoplastic rubber which comprises an optionally hydrogenated block copolymer which comprises at least two terminal poly (monovinylaromatic hydrocarbon) blocks and at least one central poly(conjugated diene) block and is present in an amount of less than 3% wt., based on total bitumen composition.

2. The process of claim 1 wherein the bitumen has a penetration index of at most 5.

3. The process of claim 2 wherein the bitumen has a penetration index in the range of from 0 to 2.

4. The process of claim 1 wherein the thermoplastic rubber is present in an amount of 0.1 to 2.5% wt.

5. The process of claim 3 wherein the thermoplastic rubber is present in an amount of 0.1 to 2.5% wt.

6. The process of claim 1 wherein the bitumen comprises a catalytically blown bitumen.

7. The process of claim 4 wherein the bitumen comprises a catalytically blown bitumen.

8. The process of claim 5 wherein the bitumen comprises a catalytically blown bitumen.

9. The process of claim 1 wherein the block copolymer has the formula $A(BA)_m$ or $(AB)_N X$ wherein A represents a block of predominantly poly(monovinyl aromatic hydrocarbon) and wherein B represents a block of predominantly poly(conjugated diene), wherein X represents the residue of a multivalent coupling agent and wherein n is an integer of at least 1 and m is an integer of at least 1.

10. The process of claim 9 wherein the A blocks are predominantly poly(styrene) block and the B blocks are predominantly poly(butadiene) blocks or predominantly poly(isoprene) blocks.

11. The process of claim 10 wherein diblocks prepared from A and B have an apparent molecular weight in the range of from 50,000 to 170,000.

12. A bitumen composition obtained by a process as defined in claim 1.

13. A bitumen composition for use in road applications which comprises an oxidised bitumen having a penetration index of at least 0 and a thermoplastic rubber comprising an optionally hydrogenated block copolymer which comprises at least two terminal poly(monovinylaromatic hydrocarbon) blocks and at least one central poly(conjugated diene) block, said rubber being present in an amount of less than 3% wt., based on total bitumen composition.

* * * * *